(12) United States Patent
Cha et al.

(10) Patent No.: US 11,228,091 B2
(45) Date of Patent: Jan. 18, 2022

(54) ELECTRONIC DEVICE INCLUDING ANTENNA USING STRUCTURE OF DISPLAY PANEL

(71) Applicant: SAMSUNG ELECTRONICS CO., LTD., Suwon-si (KR)

(72) Inventors: Do Hun Cha, Yongin-si (KR); Jung Sik Park, Suwon-si (KR); Se Hwan Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 51 days.

(21) Appl. No.: 16/634,347

(22) PCT Filed: Aug. 30, 2018

(86) PCT No.: PCT/KR2018/010078
§ 371 (c)(1),
(2) Date: Jan. 27, 2020

(87) PCT Pub. No.: WO2019/045495
PCT Pub. Date: Mar. 7, 2019

(65) Prior Publication Data
US 2020/0235463 A1    Jul. 23, 2020

(30) Foreign Application Priority Data

Aug. 31, 2017 (KR) .................. 10-2017-0110910

(51) Int. Cl.
*H01Q 1/24* (2006.01)
*H01Q 1/22* (2006.01)
*H01Q 1/38* (2006.01)

(52) U.S. Cl.
CPC .......... *H01Q 1/243* (2013.01); *H01Q 1/2266* (2013.01); *H01Q 1/38* (2013.01)

(58) Field of Classification Search
CPC .... G06F 1/1637; H01Q 13/16; H01Q 1/2266; H01Q 1/243; H01Q 1/38; H01Q 5/342; H04M 1/0266
See application file for complete search history.

(56) References Cited

U.S. PATENT DOCUMENTS 7,663,556 B2    2/2010  Desclos et al.
7,983,721 B2    7/2011  Ying et al.
(Continued)

FOREIGN PATENT DOCUMENTS

| CN | 101546052 | 9/2009 |
|---|---|---|
| CN | 201323658 | 10/2009 |

(Continued)

OTHER PUBLICATIONS

International Search Report for PCT/KR2018/010078, dated Dec. 27, 2018, 5 pages.
(Continued)

*Primary Examiner* — Thien M Le
(74) *Attorney, Agent, or Firm* — Nixon & Vanderhye, P.C.

(57) ABSTRACT

Disclosed is an electronic device, which includes a housing, a display that is exposed through a first region of a front surface of the housing, a first antenna radiator that is positioned within the housing, and a communication circuit that is positioned within the housing. The display includes a pixel layer including pixels and a conductive sheet layer under the pixel layer. The conductive sheet layer includes a first conductive region, a second conductive region, and a slit interposed between the first conductive region and the second conductive region. The first antenna radiator is electrically connected with the first conductive region of the conductive sheet layer. The communication circuit receives a signal in a specified frequency band through the first antenna radiator and the first conductive region. Above this, (Continued)

various embodiments figured out through the specification are possible.

15 Claims, 14 Drawing Sheets

(56) References Cited

U.S. PATENT DOCUMENTS

| | | | |
|---|---|---|---|
| 8,154,681 B2 | 4/2012 | Yamaguchi et al. | |
| 8,970,549 B2 | 3/2015 | Lee et al. | |
| 9,184,502 B2 | 11/2015 | Yang et al. | |
| 9,252,494 B2 | 2/2016 | Hayashi et al. | |
| 9,755,298 B2 | 9/2017 | Choi et al. | |
| 10,128,271 B2* | 11/2018 | Kimura | G06F 3/04166 |
| 10,218,058 B2 | 2/2019 | Lee et al. | |
| 11,088,437 B2 | 8/2021 | Lee et al. | |
| 2002/0152606 A1 | 10/2002 | Huang | |
| 2005/0174290 A1 | 8/2005 | Huang | |
| 2010/0001912 A1 | 1/2010 | Pekonen | |
| 2012/0146865 A1 | 6/2012 | Hayashi et al. | |
| 2012/0162032 A1 | 6/2012 | Yang et al. | |
| 2014/0132075 A1 | 5/2014 | Fishman et al. | |
| 2014/0176486 A1 | 6/2014 | Lee et al. | |
| 2015/0022081 A1 | 1/2015 | Li et al. | |
| 2015/0041786 A1 | 2/2015 | Li et al. | |
| 2015/0062459 A1 | 3/2015 | Li et al. | |
| 2016/0093943 A1 | 3/2016 | Yang et al. | |
| 2016/0328051 A1* | 11/2016 | Shishido | G06F 3/04166 |
| 2016/0349558 A1* | 12/2016 | Shishido | G02F 1/13338 |
| 2017/0269440 A1* | 9/2017 | Yoshitomi | G02F 1/134309 |
| 2018/0088705 A1* | 3/2018 | Takahashi | G06F 3/04182 |
| 2020/0134773 A1* | 4/2020 | Pinter | G06T 7/521 |

FOREIGN PATENT DOCUMENTS

| | | |
|---|---|---|
| CN | 204291104 | 4/2015 |
| EP | 0 911 906 | 4/1999 |
| EP | 1 603 188 | 12/2005 |
| EP | 2 008 339 | 12/2008 |
| EP | 2 146 391 | 1/2010 |
| KR | 10-2014-0083634 | 7/2014 |
| KR | 10-2016-0084192 | 7/2016 |
| KR | 10-2017-0094748 | 8/2017 |
| KR | 10-2017-0096866 | 8/2017 |
| WO | 2011/059088 | 5/2011 |

OTHER PUBLICATIONS

Written Opinion of the ISA for PCT/KR2018/010078, dated Dec. 27, 2018, 5 pages.
First Office Action dated Dec. 18, 2020 in counterpart Chinese Patent Application No. 201880056592.5 and English-language translation.
Extended Search Report dated Jun. 29, 2020 in counterpart European Patent Application No. 18849875.2.
Notice of Preliminary Rejection dated Aug. 13, 2021 in Korean Application No. 10-2017-0110910 and English-language translation.

* cited by examiner

ELECTRONIC DEVICE INCLUDING ANTENNA USING STRUCTURE OF DISPLAY PANEL

This application is the U.S. national phase of International Application No. PCT/KR2018/010078 filed 30 Aug. 2018, which designated the U.S. and claims priority to KR Patent Application No. 10-2017-0110910 filed 31 Aug. 2017, the entire contents of each of which are hereby incorporated by reference.

BACKGROUND

1. Field

The present disclosure relates to a technology for an antenna.

2. Description of Related Art

An electronic device such as a smartphone, a tablet, or the like may communicate with a network by using an internal or external antenna. An electronic device may transmit or receive a signal in a frequency band (e.g., 900 MHz band, 1.8 GHz band, 2.1 GHz band, or the like) for $3^{rd}$ generation (3G) communication to a frequency band for $4^{th}$ generation (4G) and $5^{th}$ generation (5G) communication depending on an electrical path for transmitting or receiving a signal.

Also, the electronic device may provide various services, such as a service of capturing an image (or a video image), a service of playing an image, a game service, through a display. The electronic device may provide a service to a user by displaying contents and a user interface in the display. As such, the electronic device may provide the user with a convenient user experience (UX) through various contents and UIs.

The above information is presented as background information only to assist with an understanding of the present disclosure. No determination has been made, and no assertion is made, as to whether any of the above might be applicable as prior art with regard to the present disclosure.

SUMMARY

The thickness of a portable electronic device is gradually decreasing for portability, but the area of a display included in the portable electronic device is gradually increasing for the purpose of providing various services to the user. The size of the display in the portable electronic device is being increased by removing physical buttons for the purpose of overcoming a limitation on a space and receiving a user input through the display (e.g., a touchscreen display). As such, a space to implement an antenna for communicating with an external electronic device is gradually decreasing.

Also, as a distance between components of the portable electronic device decreases and a member for reducing interference between components is omitted, noise interferes in data exchanged between components.

Aspects of the present disclosure are to address at least the above-mentioned problems and/or disadvantages and to provide at least the advantages described below. Various embodiments of the present disclosure may use a component of an electronic device as an antenna for communication with an external electronic device and may prevent noise from being included in data exchanged between components.

In accordance with an aspect of the present disclosure, an electronic device may include a housing, a display that is exposed through a first region of a front surface of the housing, a first antenna radiator that is positioned within the housing, and a communication circuit that is positioned within the housing. The display may include a pixel layer including pixels and a conductive sheet layer under the pixel layer. The conductive sheet layer may include a first conductive region, a second conductive region, and a slit interposed between the first conductive region and the second conductive region. The first antenna radiator may be electrically connected with the first conductive region of the conductive sheet layer. The communication circuit may receive a signal in a specified frequency band through the first antenna radiator and the first conductive region.

In accordance with another aspect of the present disclosure, an electronic device may include a display panel that includes at least one pixel for displaying an image, a metal member that is formed adjacent to at least a partial region of the display panel and is formed at at least a portion of a housing of the electronic device, a metal layer that is positioned below the display panel and includes a first region and a second region physically separated from the first region. The first region of the metal layer may be electrically connected with the metal member. A substrate may be positioned below the metal layer and may include a ground connected with the second region of the metal layer. At least one wireless circuit which may receive a signal through the metal member may be positioned on the substrate.

In accordance with another aspect of the present disclosure, an electronic device may include a housing, a display that is exposed through a first region of a front surface of the housing, and a communication circuit that is positioned within the housing. At least a portion of the housing may include a metal member, and the display may include a pixel layer including pixels and a conductive sheet layer under the pixel layer. The conductive sheet layer may include a first conductive region, a second conductive region, and a slit interposed between the first conductive region and the second conductive region, the metal member of the housing may be electrically connected with the first conductive region of the conductive sheet layer, and the communication circuit may receive a signal in a specified frequency band through the first conductive region and the metal member.

According to embodiments of the present disclosure, at least a portion of a conductive sheet layer included in a display may be used as an antenna for communicating with an external electronic device, and noise which may be transmitted to a display driver IC (DDI) through the conductive sheet layer may be prevented. Also, since there is no need to include an antenna and a separate component for blocking noise, the thickness of an electronic device may decrease, or the performance or function(s) of the electronic device may be updated.

In addition, even though any other component, which is included in the electronic device, such as a housing is electrically connected with a component, which forms an antenna, such as a conductive sheet layer, electric shock of the user may be prevented by blocking a DC current which may flow to the other component.

Besides, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

With reference to the drawings, the same or similar components may be designated by the same or similar reference numerals.

DETAILED DESCRIPTION OF EXAMPLES EMBODIMENTS

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure.

Figure 1:
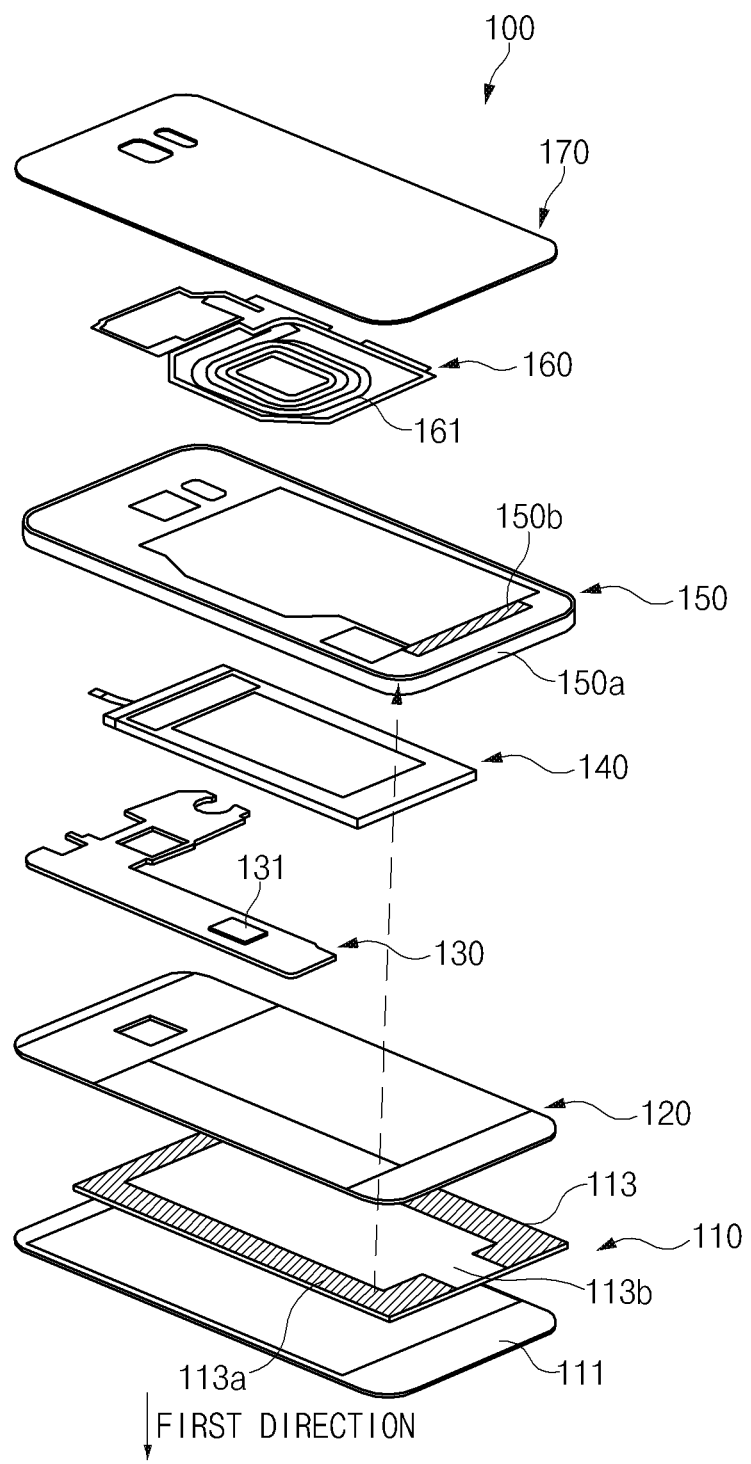
FIG. 1 is an exploded perspective view illustrating components of an electronic device according to various embodiments.

FIG. 1 is an exploded perspective view illustrating components of an electronic device according to various embodiments.

Referring to FIG. 1, an electronic device 100 may include a display 110, a bracket 120, a printed circuit board (PCB) 130, a battery 140, a housing 150, a first antenna radiator 160, and a rear cover 170. According to an embodiment, the electronic device 100 may be implemented without some of the components illustrated in FIG. 1 or may be implemented to further include one or more components not illustrated in FIG. 1. Also, the order in which the components included in the electronic device 100 are stacked may be different from the stacked order illustrated in FIG. 1.

According to an embodiment, the display 110 may include a display panel 111 and a conductive sheet layer (or a metal layer) 113. According to an embodiment, the display 110 may be exposed through a first region in a front surface of the housing 150. Also, the display 110 may further include a touch panel (not illustrated) for receiving a user input. The user input (e.g., a touch input) may be received through the touch panel.

According to an embodiment, the display panel 111 may include a pixel layer for displaying a received image. In other words, the display panel 111 may include at least one pixel. The display panel 111 may be electrically connected with the PCB 130 to receive data associated with contents (e.g., a text, an image, a video image, a user interface (UI), or the like), and may control the pixel layer depending on the received data so as to display (or output) the contents.

According to an embodiment, the conductive sheet layer 113 may be positioned on the display panel when viewed in a first direction. The conductive sheet layer 113 may prevent electro-magnetic interference between vertically positioned components by shielding an electromagnetic wave generated from the components. The conductive sheet layer 113 may include a thin film sheet (or a plate) formed of copper (Cu) or graphite.

According to an embodiment, the conductive sheet layer 113 may include a first region 113a and a second region 113b. The first region 113a and the second region 113b may be separated by a slit. The first region 113a may be utilized as an antenna element.

According to an embodiment, the bracket 120 may be interposed between the display 110 and the housing 150. For example, the bracket 120 may be coupled with the first region 113a of the conductive sheet layer 113 by a conductive tape. According to an embodiment, the bracket 120 may fix the PCB 130 to the housing 150.

According to an embodiment, the PCB 130 may include a plurality of components for an operation of the electronic device 100. The plurality of components may be mounted on the PCB 130, and the plurality of components mounted may be electrically connected to each other through a printed circuit. The plurality of components electrically connected may be classified into modules for implementing a function (s) of the electronic device 100. The plurality of components may include, for example, an application processor (AP), a communication processor (CP), a display driver integrated circuit (IC) (DDI), or a communication circuit (or a wireless circuit) 131. In the present disclosure, the PCB 130 may be referred to as a "main board" or "printed board assembly (PBA)". According to an embodiment, the PCB 130 may include a plurality of PCBs. The plurality of PCBs may include, for example, a main PCB and a sub PCB. The plurality of PCBs may be electrically connected to each other.

According to an embodiment, the PCB 130 may include the communication circuit 131. In other words, the communication circuit 131 may be positioned on the PCB 130. The communication circuit 131 may feed an antenna element to transmit or receive a signal. In the present disclosure, "feed" (or "feeding") may mean an operation in which the communication circuit 131 applies a current to an antenna element. According to an embodiment, the PCB 130 may include a ground region (or a ground part). The ground region may be formed of one layer of a plurality of layers of the PCB 130. The ground region may be electrically connected with an antenna element to form an electrical path for transmitting or receiving a signal. According to an embodiment, the battery 140 may convert chemical energy and electrical energy bidirectionally. For example, the battery 140 may convert chemical energy into electrical energy and may supply the electrical energy to the display 110 and a component (or a module) mounted on the PCB 130. The battery 140 may convert and store electrical energy supplied from the outside into chemical energy. In other words, the battery 140 may be a secondary cell which may be rechargeable. A charging/discharging state of the battery 140 may be managed by a battery management module (or a battery management system (BMS)) of the PCB 130.

According to an embodiment, the housing 150 may protect the components included in the electronic device 100. For example, components such as the bracket 120, the PCB 130, the battery 140, and the like may be accommodated within the housing 150. The housing 150 may protect the accommodated components from external shock. According to an embodiment, the housing 150 may be coupled with the bracket 120 such that the bracket 120 is not exposed to the outside. For example, the housing 150 may be coupled with the bracket 120 by using a c-clip or a screw.

According to an embodiment, the housing 150 may include a side member 150a. At least a portion of the side member 150a may include a conductive material (e.g., metal). For example, at least a portion of the side member 150a may include a metal member. The metal member may be formed, for example, at the side member 150a of the housing 150 so as to be adjacent to at least a partial region of the display 110. The metal member of the side member 150a may be utilized, for example, as an antenna element for transmitting or receiving a signal in a specified frequency band.

According to an embodiment, the first antenna radiator 160 may be positioned on a rear surface of the housing 150 when viewed in the first direction. The first antenna radiator 160 may include an antenna pattern 161. The antenna pattern 161 may be printed and formed on a flexible PCB (FPCB). According to an embodiment the first antenna radiator 160 may be electrically connected with another antenna element and may form an electrical path for transmitting or receiving a signal in a specified frequency band. For example, the first antenna radiator 160 may be electrically connected with the first region 113a of the conductive sheet layer 113 through a conductive pad 150b, which is electrically connected to a screw hole or a c-clip for connecting the bracket 120 and the housing 150.

According to an embodiment, the rear cover 170 may be coupled on the rear surface of the housing 150 when viewed in the first direction. The rear cover 170 may be formed of at least one of tempered glass, plastic, and metal. According to an embodiment, the rear cover 170 may be integrally implemented with the housing 150 or may be implemented to be removable by the user.

In the present disclosure, the description given with reference to FIG. 1 may be identically or similarly applied to components having the same reference numerals/marks as components of the electronic device 100 described with reference to FIG. 1.

Figure 2:
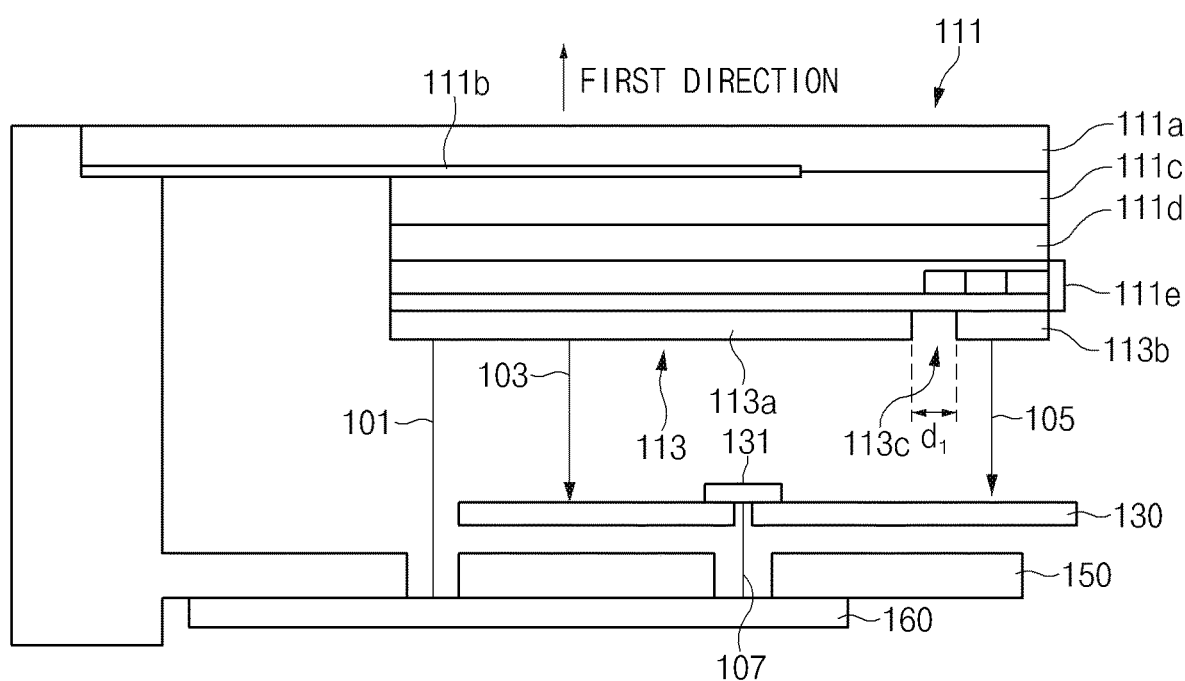
FIG. 2 is a sectional view illustrating that an electronic device according to an embodiment uses a conductive sheet layer of a display as an antenna.

FIG. 2 is a sectional view illustrating that an electronic device according to an embodiment uses a conductive sheet layer of a display as an antenna.

Referring to FIG. 2, the electronic device 100 may transmit or receive a signal in a specified frequency band by using the first region 113a of the conductive sheet layer (or a metal layer) 113 and the first antenna radiator 160.

According to an embodiment, the display panel 111 of the display 110 may include a cover glass 111a, a bezel 111b, an optical crystal adhesive (OCA) film 111c, a polarizing (POL) film 111d, and a pixel layer 111e. According to an embodiment, the display panel 111 may be a liquid crystal display (LCD) panel, a thin film transistor-liquid crystal display (TFT-LCD) panel, a light emitting diode (LED) display panel, or an organic LED (OLED) display panel.

According to an embodiment, the cover glass 111a may transmit light generated by the display 110. Also, the user may touch a portion (e.g., a finger) of his/her body on the cover glass 111a to perform touch. For example, the cover glass 111a may be formed of tempered glass, reinforced plastics, a flexible polymer material, or the like.

According to an embodiment, the bezel 111b may be formed at an edge of the cover glass 111a. For example, the bezel 111b may be formed by printing an ink of a specified color (e.g., a black color or a white color) at the edge of the cover glass 111a. According to an embodiment, the bezel 111b may cover a wiring formed at the display panel 111.

According to an embodiment, the OCA film 111c may attach the cover glass 111a to the POL film 111d while maintaining high transmittance. According to an embodiment, the POL film 111d may be positioned below the cover glass 111a when viewed in the first direction. The POL film 111d may be attached to the cover glass 111a through the OCA film 111c. According to an embodiment, the POL film 111d may separately transmit or block vertical or horizontal polarization of light incident from the pixel layer 111e.

According to an embodiment, the pixel layer 111e may be positioned under the POL film 111d when viewed in the first direction. According to an embodiment, the pixel layer 111e may include a plurality of pixels. The plurality of pixels may be positioned on a substrate in a specified arrangement. The plurality of pixels may be implemented by using an LCD pixel, an LED pixel, or an OLED pixel, for example. According to an embodiment, the pixel layer 111e may be electrically connected with a DDI (not illustrated) to receive data of an image (or a video image). For example, the DDI may be mounted on the PCB 130 or on a flexible PCB (FPCB) electrically connecting the pixel layer 111e and the PCB 130. According to an embodiment, the pixel layer 111e may display an image depending on the received information.

According to an embodiment, the conductive sheet layer 113 may be positioned under the pixel layer 111e when viewed in the first direction. According to an embodiment, the conductive sheet layer 113 may include a first conductive region (or a first region) 113a, a second conductive region (or a second region) 113b, and a slit 113c. For example, the conductive sheet layer 113 may be divided into the first conductive region 113a and the second conductive region 113b which are physically separated from each other. The first conductive region 113a and the second conductive region 113b may be positioned in the same plane. The slit 113c may be defined between the first conductive region 113a and the second conductive region 113b. In other words, the first conductive region 113a and the second conductive region 113b may be separated by the slit 113c. The first conductive region 113a and the second conductive region 113b may be electrically connected to each other, or may be physically separated from each other by the slit 113c.

According to an embodiment, the first conductive region 113a of the conductive sheet layer 113 may be electrically connected with the first antenna radiator 160. For example, the first conductive region 113a may be electrically connected with the first antenna radiator 160 positioned on the rear surface of the housing 150 through a first conductive line 101. According to an embodiment, the first conductive region 113a may be electrically connected with the ground region of the PCB 130. For example, the first conductive region 113a may be electrically connected with the ground region through a second conductive line 103. As such, the first conductive region 113a and the first antenna radiator 160 may form an electrical path which may receive a signal in a specified frequency band.

According to an embodiment, the second conductive region 113b may be electrically connected with the ground region of the PCB 130. For example, the second conductive region 113b may be electrically connected with the ground region through a third conductive line 105. According to an embodiment, the second conductive region 113b may be positioned in a region, in which a data line(s) exists, of the display panel 111. As such, the first conductive region 113a may be positioned outside the region, in which the data line(s) exists, of the display panel 111. Regions in which the first conductive region 113a and the second conductive region 113b are positioned will be more fully described with reference to FIGS. 4A and 4B.

According to an embodiment, the slit 113c of the conductive sheet layer 113 may be formed at the conductive sheet layer 113 with a specified interval di. The specified interval di may be determined based on an electrical path of the first conductive region 113a for receiving a signal. For example, an interval of the slit 113c may be determined such that the first conductive region 113a and the second conductive region 113b are not coupled through the slit 113c. Whether the first conductive region 113a and the second conductive region 113b are coupled may be determined by an electrical path formed by the first conductive region 113a and the interval di of the slit 113c. A length of the electrical path formed by the first conductive region 113a and the interval di of the slit 113c may be a trade-off. In other words, under the condition that the first conductive region 113a and the second conductive region 113b are not coupled to each other, the interval di of the slit 113c may become shorter as the length of the electrical path formed by the first conductive region 113a increases and may become longer as the length of the electrical path formed by the first conductive region 113a decreases.

According to an embodiment, the PCB 130 may include the communication circuit 131 and the ground region. For example, the communication circuit 131 may be electrically connected with the first antenna radiator 160 positioned on the rear surface of the housing 150 through a fourth conductive line 107. The ground region may be electrically connected to the first conductive region 113a of the conductive sheet layer 113 through the second conductive line 103. As such, the communication circuit 131 may transmit/receive a signal in a specified frequency band through the first antenna radiator 160 and the first conductive region 113a. Also, the ground region may be electrically connected with the second conductive region 113b through the third conductive line 105. As such, noise may be prevented from being transferred to the DDI through the conductive sheet layer 113 (e.g., the second conductive region 113b).

As a slit is formed at the conductive sheet layer 113 of the display panel 111, the electronic device 100 may use at least a portion of the conductive sheet layer 113 as an antenna element while preventing a flicker phenomenon in which noise is transferred to the DDI through the conductive sheet layer 113.

Figure 3:
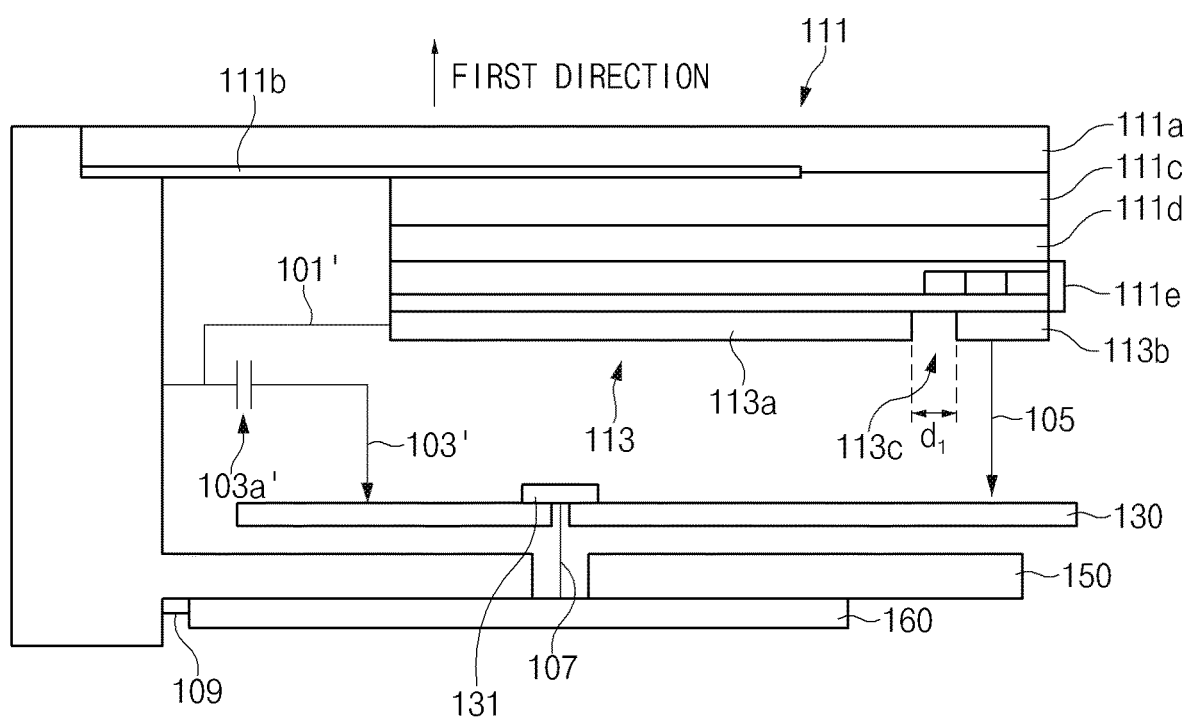
FIG. 3 is a sectional view illustrating that an electronic device according to an embodiment uses a conductive sheet layer and a housing as an antenna.

FIG. 3 is a sectional view illustrating that an electronic device according to an embodiment uses a conductive sheet layer and a housing as an antenna.

Referring to FIG. 3, the electronic device 100 may transmit or receive a signal in a specified frequency band by using the first region 113a of the conductive sheet layer (or a metal layer) 113, at least a portion of the housing 150, and the first antenna radiator 160.

According to an embodiment, descriptions associated with the cover glass 111a, the bezel 111b, the OCA film 111c, the POL film 111d, and the pixel layer 111e of the display panel 111, the conductive sheet layer 113, the PCB 130, the housing 150, and the first antenna radiator 160 may be given as in the descriptions given with reference to FIG. 2. Below, a difference will be focused below.

According to an embodiment, the conductive sheet layer 113 may include the first conductive region (or a first region) 113a, the second conductive region (or a second region) 113b, and the slit 113c. According to an embodiment, the slit 113c of the conductive sheet layer 113 may be formed at the conductive sheet layer 113 with a specified interval di.

According to an embodiment, the first conductive region 113a of the conductive sheet layer 113 may be electrically connected with the housing 150. For example, the first conductive region 113a may be electrically connected with the housing 150 through a first conductive line 101'. The first conductive region 113a may be electrically connected with the metal member of the housing 150, for example. According to an embodiment, the first conductive region 113a may be electrically connected with the ground region of the PCB 130. For example, the first conductive region 113a may be electrically connected with the ground region through the housing 150. For example, the housing 150 may be electrically connected with the ground region through a second conductive line 103'. According to an embodiment, a capacitor 103a' may be connected to the second conductive line 103'. For example, the capacitor 103a' may be connected on an electrical path between the metal member of the housing 150 and the ground region of the PCB 130. The capacitor 103a' may block a DC current flowing from the PCB 130. As such, the electronic device 100 may prevent electric shock due to the DC current which may flow to the user through the housing 150.

According to an embodiment, the second conductive region 113b of the conductive sheet layer 113 may be electrically connected with the ground region of the PCB 130 through the third conductive line 105. As such, noise may be prevented from flowing to the DDI through the conductive sheet layer 113.

According to an embodiment, the communication circuit 131 of the PCB 130 may be electrically connected with the first antenna radiator 160 positioned on the rear surface of the housing 150 through the fourth conductive line 107.

According to an embodiment, the housing 150 may be electrically connected with the first antenna radiator 160 through a fifth conductive line 109. For example, the first antenna radiator 160 may be electrically connected with the metal member of the housing 150 electrically connected with the first conductive region 113a of the conductive sheet layer 113. As such, the communication circuit 131 may form an electrical path which may receive a signal in a specified frequency band through the first conductive region 113a, the metal member of the housing 150, and the first antenna radiator 160.

The electronic device 100 may use, as an antenna element, the housing 150 as well as the first region 113a of the conductive sheet layer 113, and may prevent electric shock of the user through the housing 150 by connecting the capacitor 103a' between the ground region of the PCB 130 and the metal member of the housing 150.

Figure 4A:
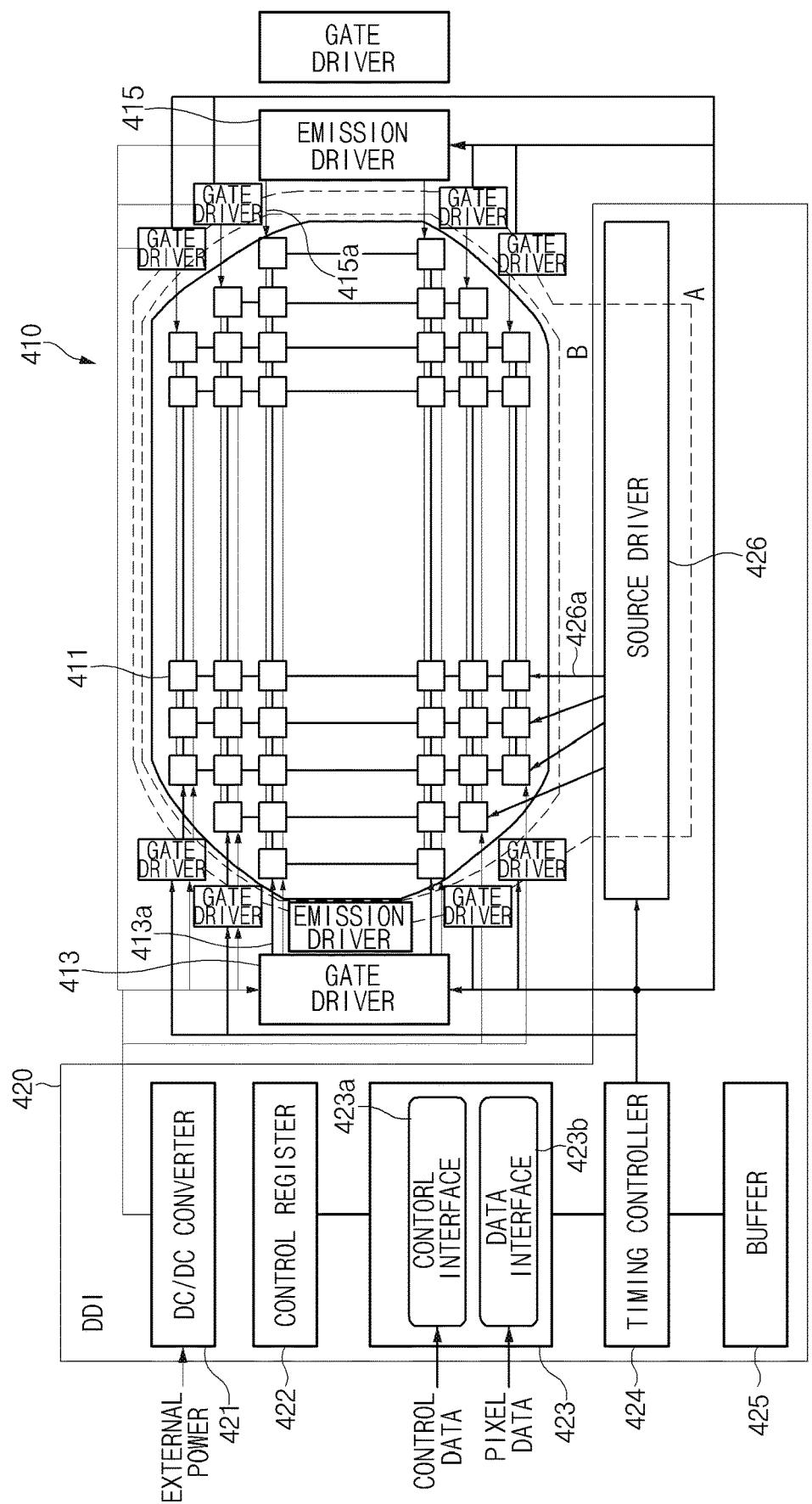
FIG. 4A is a view illustrating a region, in which a separated region of a conductive sheet layer is positioned, of a display panel of an electronic device according to an embodiment.

FIG. 4A is a view illustrating a region, in which a separated region of a conductive sheet layer is positioned, of a display panel of an electronic device according to an embodiment.

Referring to FIG. 4A, a first conductive region (e.g., the first conductive region 113a of FIG. 1) and a second conductive region (e.g., the second conductive region 113b of FIG. 1) of a conductive sheet layer may be positioned depending on a data line between a display 410 (e.g., the display panel 111 of FIG. 1) and a DDI 420.

According to an embodiment, the display 410 may include a plurality of pixels 411, a gate driver 413, and an emission driver 415. The plurality of pixels 411 may be arranged at specified intervals. A plurality of gate drivers 413 may be positioned on opposite sides of the plurality of pixels 411, and a plurality of emission drivers 415 may be positioned on opposite sides of the plurality of pixels 411.

According to an embodiment, the plurality of pixels 411 may convert an electrical signal to an optical signal to display an image. For example, the plurality of pixels 411 may display an image in response to control signals from the gate driver 413 and the emission driver 415.

According to an embodiment, the gate driver 413 may drive gate lines of the plurality of pixels 411. For example, the gate driver 413 may scan the gate lines of the plurality of pixels 411, and may drive the plurality of pixels 411 depending on data for controlling a pixel. The gate driver 413 may provide, for example, data for controlling a pixel to the plurality of pixels 411 through a first data line 413a.

According to an embodiment, the emission driver 415 may drive emission lines of the plurality of pixels 411. For example, the emission driver 415 may scan the emission lines of the plurality of pixels 411, and may drive the plurality of pixels 411 depending on data for controlling a pixel. The emission driver 415 may provide, for example, data for controlling a pixel to the plurality of pixels 411 through a second data line 415a.

According to an embodiment, the DDI 420 may include a DC/DC converter 421, a control register 422, an interface 423, a timing controller 424, a timing controller 424, a buffer 425, and a source driver 426. The DDI 420 may be positioned on a PCB or a FPCB and may be electrically connected to the display 410. The DDI 420 may process image data transmitted from an application processor (AP) positioned on the PCB and may transmit the processed data to the display 410. The DDI 420 may be mounted on the PCB or the FPCB electrically connecting the PCB and the display 410.

According to an embodiment, the DC/DC converter 421 may convert a power input from the outside and may supply the converted power to the display 410. The DC/DC converter 421 may convert a DC current, which is rectified after being input from the outside, to a current necessary for the display 410.

According to an embodiment, the control register 422 may temporarily store data input to the DDI 420 and may rearrange the stored data.

According to an embodiment, the interface 423 may receive data from the outside. The interface 423 may receive control data for controlling a gate driver and an emission driver and pixel data for controlling a source driver through a control interface 423a and a data interface 423b, respectively.

According to an embodiment, the timing controller 424 may control the gate driver 413, the emission driver 415, and the source driver 426 based on data input through the interface 423. For example, the timing controller 424 may transmit the control data (e.g., an on/off value) to the gate driver 413 and the emission driver 415 and may transmit the pixel data (e.g., an RGB value) to the source driver 426.

According to an embodiment, the buffer 425 may temporarily store data provided from the timing controller 424 for the purpose of controlling the display 410 and may compensate for a difference between speeds at which data are respectively transmitted to a plurality of drivers.

According to an embodiment, the source driver 426 may display an image to the display 410 by transmitting analog data (e.g., a voltage value) corresponding to digital data input from the timing controller 424 to the plurality of pixels 411. The source driver 426 may be electrically connected with the plurality of pixels 411 through a third data line 426a and may transmit the analog data. In other words, data corresponding to the received image information may be transmitted to the display 410 through the third data line 426a.

According to an embodiment, in the case of using a partial region (e.g., a first region) as an antenna element by forming a slit at a conductive sheet layer included in the display 410, the partial region of the conductive sheet layer may be positioned outside a region, in which a data line for transmitting the data exists, of the display 410. For example, the first region of the conductive sheet layer may be positioned outside a region "A" in which there exists the third data line 426a connecting the plurality of pixels 411 of the display 410 and the source driver 426 of the DDI 420. In other words, the first region may be positioned outside a region, which includes a region, in which pixels exist, of a pixel layer of the display 410 and a region "B" (e.g., a partial region of a PCB, or a FPCB) for electrically connecting the pixel layer and the source driver 426 of the DDI 420. The second region of the conductive sheet layer may be positioned in the region "A" in which the third data line 426a exists. In other words, the second region may be positioned in the region, which includes the region, in which pixels exist, of the pixel layer and the region for electrically connecting the pixel layer and the source driver 426. As such, data corresponding to an image may be prevented from being changed by signals exchanged through the partial region of the conductive sheet layer.

Figure 4B:
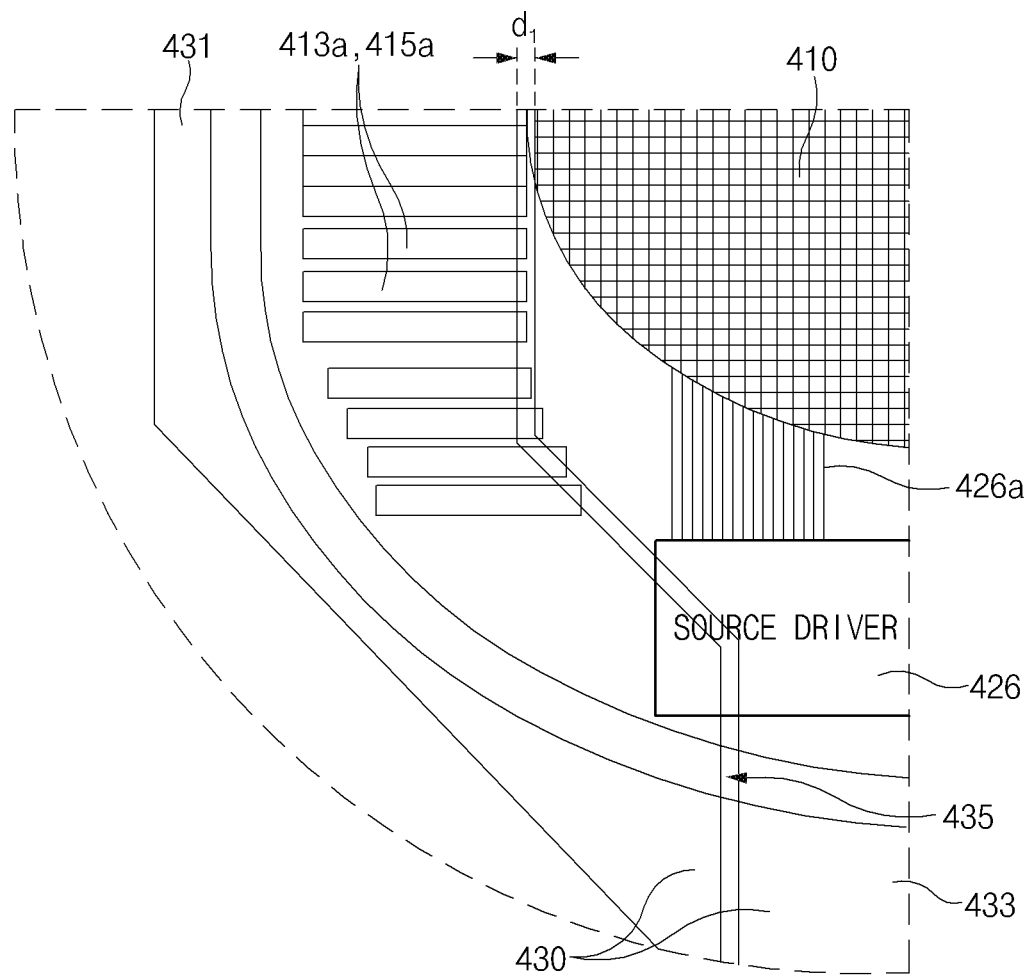
FIG. 4B is an enlarged view partially illustrating a portion "A" of FIG. 4A.

FIG. 4B is an enlarged view partially illustrating the portion "A" of FIG. 4A.

Referring to FIG. 4B, a first region 431 and a second region 433 of a conductive sheet layer 430 may be respectively positioned depending on a data line through which image data are transmitted.

According to an embodiment, the first data line 413a and the second data line 415a, which are used to transmit data for controlling a pixel, and the third data line 426a for transmitting data corresponding to image information may be present in a display panel 410.

According to an embodiment, the first region 431 and the second region 433 of the conductive sheet layer 430 may be positioned based on a region in which there exists a data line, which is used to transmit data corresponding to image information, from among a plurality of data lines. For example, the second region 433 of the conductive sheet layer 430 may be positioned in a region in which there exists the third data line 426a for connecting a plurality of pixels of the display panel 410 and the source driver 426. The first region 431 and the second region 433 of the conductive sheet layer 430 may be physically separated from each other. For example, the first region 431 and the second region 433 may be physically separated by a slit 435 formed with the specified interval di.

Figure 5:
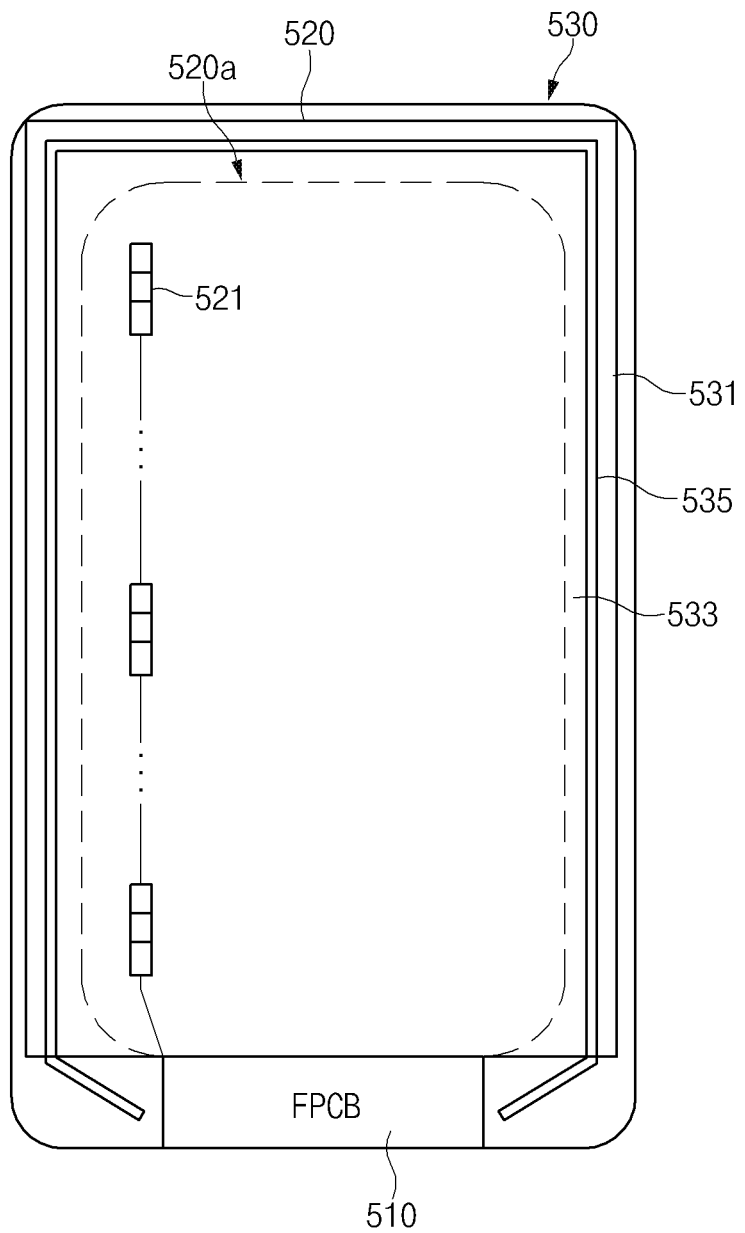
FIGS. 5 and 6 are views illustrating shapes of a slit formed at a conductive sheet layer of an electronic device according to an embodiment.
Figure 6:
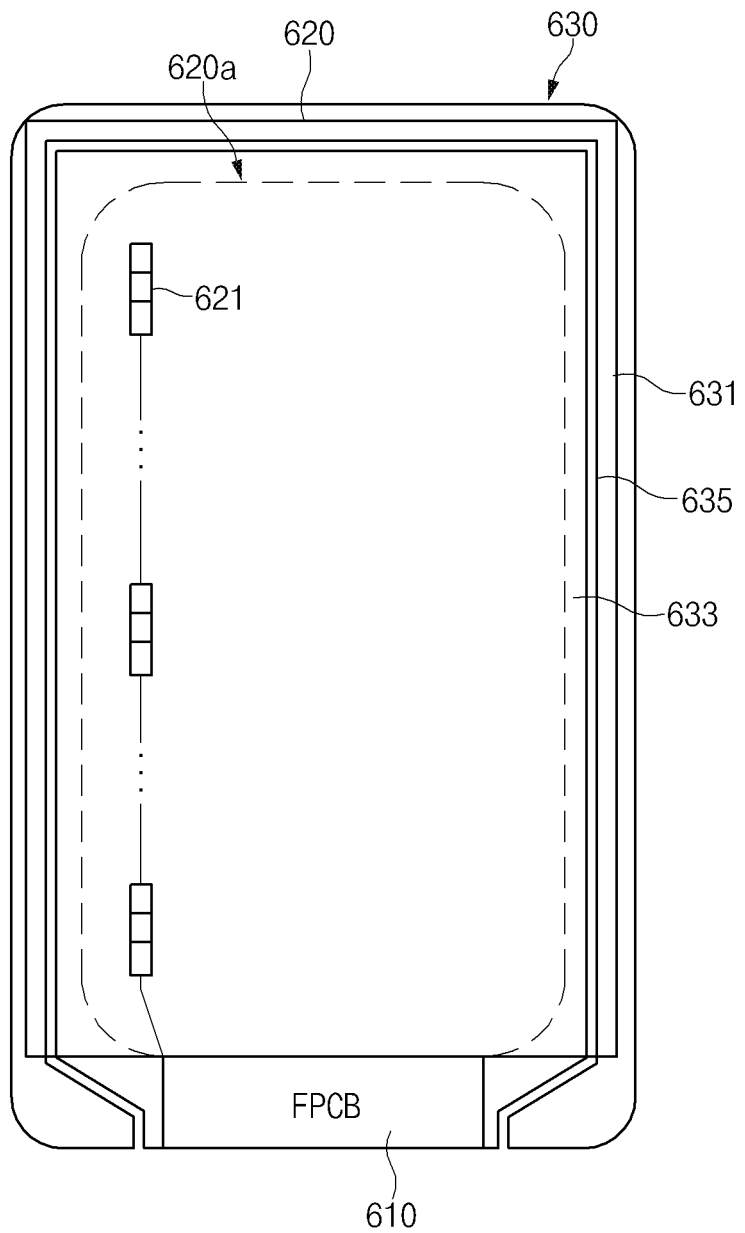

FIGS. 5 and 6 are views illustrating shapes of a slit formed at a conductive sheet layer of an electronic device according to an embodiment.

Referring to FIG. 5, a first region 531 of a conductive sheet layer 530 (e.g., the conductive sheet layer 430 of FIG. 4B) separated by a slit 535 (e.g., the slit 435 of FIG. 4B) may be an edge region of a conductive sheet layer 530. The first region 531 and a second region 533 of the conductive sheet layer 530 may be physically connected to each other.

According to an embodiment, a data line for transmitting image data from a DDI (e.g., a source driver) to a plurality of pixels 521 may be present in a FPCB 510 and a display panel 520. According to an embodiment, at least one wireless circuit which may transmit/receive a signal may be positioned at a portion of the FPCB 510.

According to an embodiment, the conductive sheet layer 530 may include the first region 531, the second region 533, and the slit 535. The slit 535 may be formed such that the first region 531 is positioned outside a region where a data line exists and such that the second region 533 is positioned in the region where the data line exists. For example, the slit 535 may be formed such that the first region 531 is positioned outside a region including a region, which may cover the FPCB 510 where a data line exists, and a region 520a, in which the pixels 521 exits, of the display panel 520 and such that the second region is positioned in the region including the region, which may cover the FPCB 510, and the region 520a, in which the pixels 521 exits, of the display panel 520. The slit 535 may be formed, for example, such that the first region 531 corresponds to an edge region of the conductive sheet layer 530 and such that the first region 531 and the second region 533 are physically connected.

Referring to FIG. 6, a first region 631 and a second region 633 of a conductive sheet layer 630 may be physically separated from each other. For example, a slit 635 may be formed such that the first region 631 corresponds to an edge region of the conductive sheet layer 630 and such that the first region 631 and the second region 633 are physically separated. The first region 631 may be positioned outside a region including a region, which may cover a FPCB 610, and a region 620a where pixels 621 exist.

As such, the first region 531/631 of the conductive sheet layer 530/630 may form an electrical path for receiving a signal in a specified frequency band as a portion of an antenna element, without interference with image data to be transmitted to the display panel 520/620.

Figure 7:
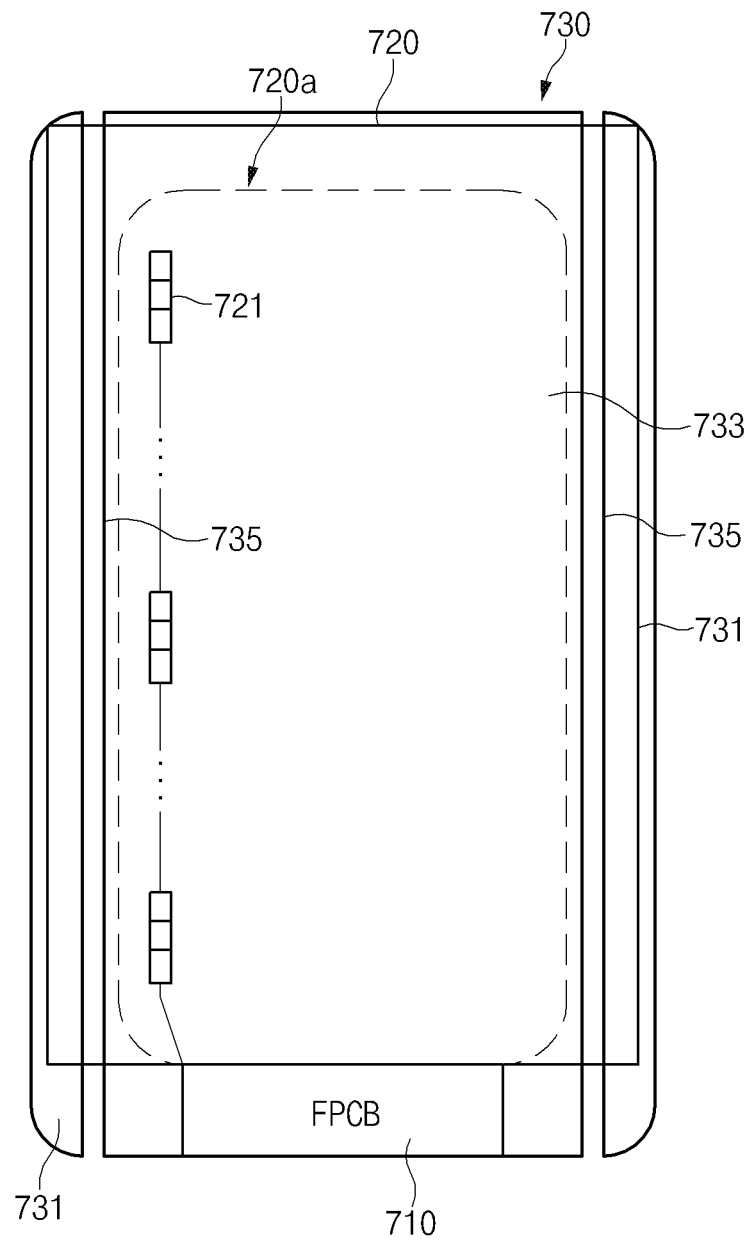
FIG. 7 is a view illustrating that opposite-side end portions of a conductive sheet layer of an electronic device according to an embodiment are separated by a slit.

FIG. 7 is a view illustrating that opposite-side end portions of a conductive sheet layer of an electronic device according to an embodiment are separated by a slit.

Referring to FIG. 7, a first region 731 and a second region 733 of a conductive sheet layer 730 may be physically separated by a slit 735. The first region 731 may correspond to an opposite-side region of the conductive sheet layer 730. In other words, the first region 731 of the conductive sheet layer 730 may include regions which are separated to opposite sides. The first region 731 may be positioned outside a region including a region, which may cover a FPCB 710 where a data line exists, and a region 720a, in which pixels 720 exist, of a display panel 720. As such, the electronic device 100 may use at least one of the regions separated into the opposite sides as an antenna element.

Figure 8:
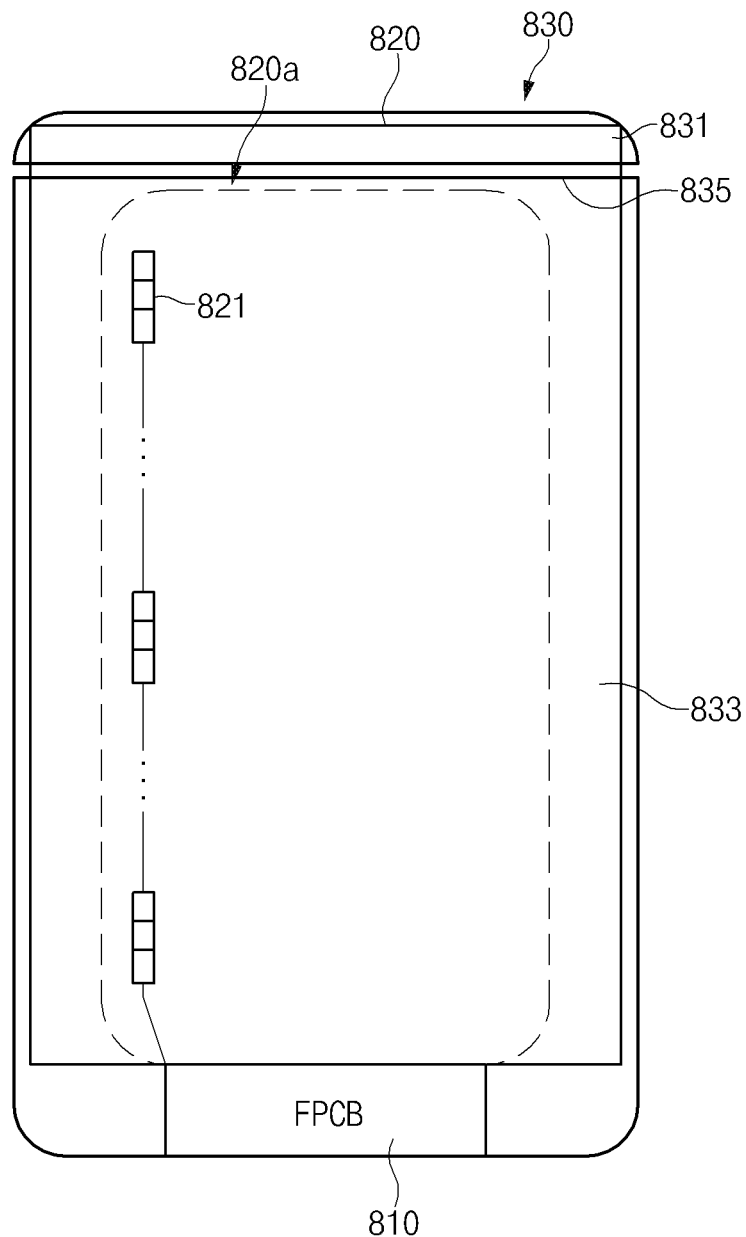
FIG. 8 is a view illustrating that a conductive sheet layer of an electronic device according to an embodiment is vertically separated by a slit.

FIG. 8 is a view illustrating that a conductive sheet layer of an electronic device according to an embodiment is vertically separated by a slit.

Referring to FIG. 8, a first region 831 and a second region 833 of a conductive sheet layer 830 may be physically separated by a slit 835. The first region 831 may be an upper-side region of the conductive sheet layer 830. The first region 831 may be positioned outside a region including a region, in which a data line exists, of a FPCB 810 and a region 820a, in which pixels 820 exist, of a display panel 820. As such, the electronic device 100 may use the upper-side region as an antenna element.

Figure 9A:
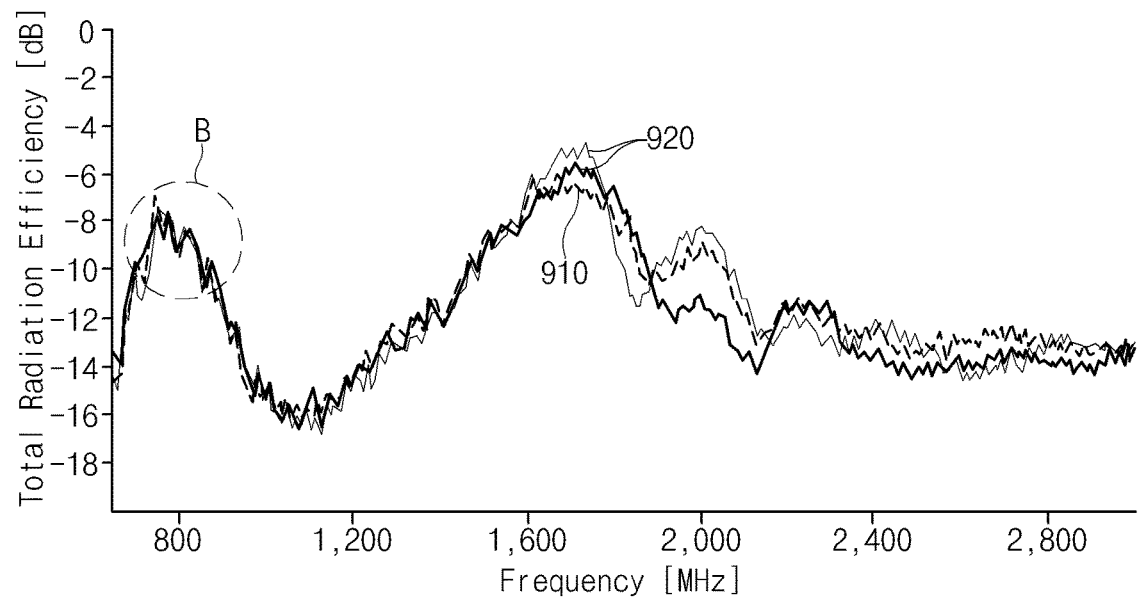
FIGS. 9A, 9B, and 10 are graphs illustrating radiation efficiency and reflection coefficient of an electronic device according to an embodiment.
Figure 9B:
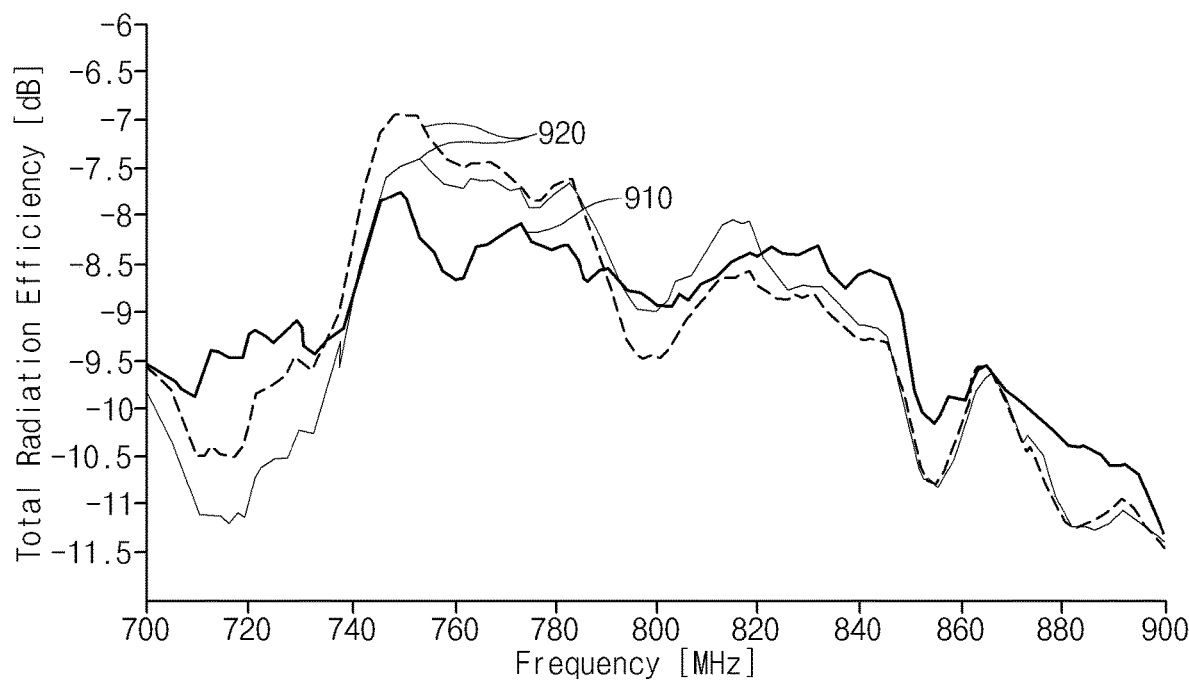
Figure 10:
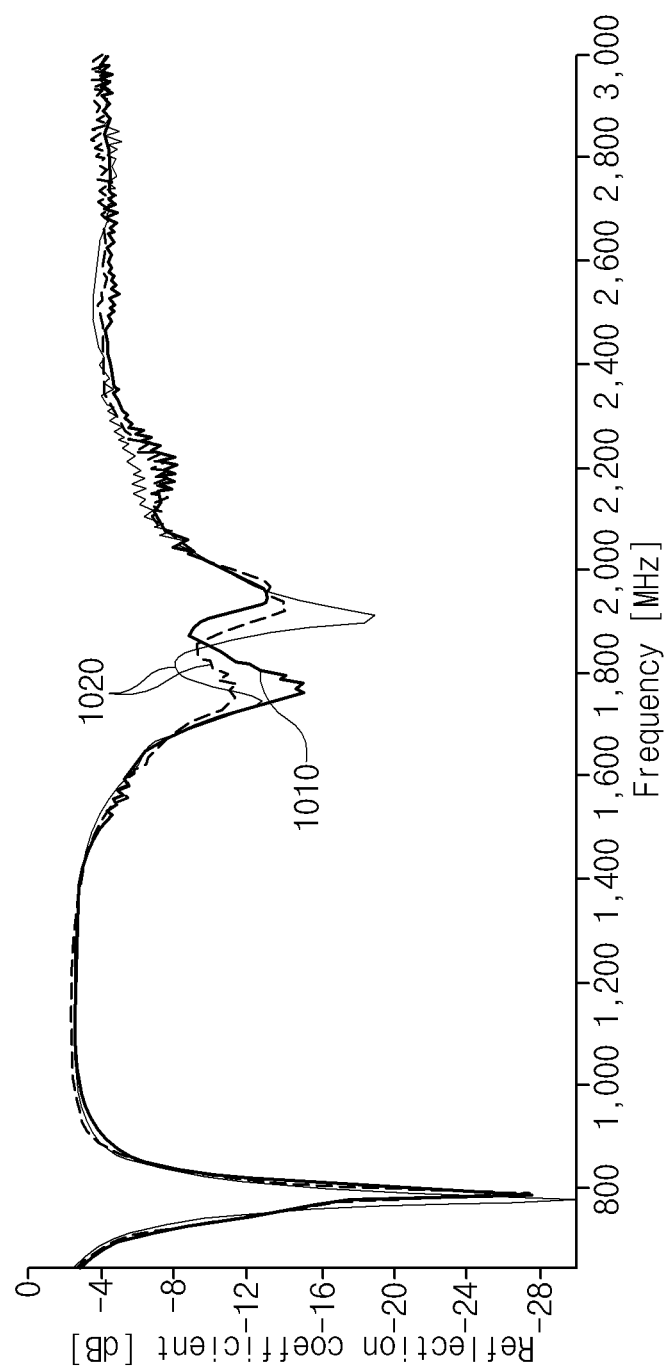

FIGS. 9 to 10 are graphs illustrating radiation efficiency and reflection coefficient of an electronic device according to an embodiment.

Referring to FIG. 9A, radiation efficiency of an antenna 920 according to the embodiments of FIGS. 7 and 8 may increase in a low band (e.g., ranging from approximately 700 MHz to approximately 1000 MHz) compared with an antenna 910 according to a comparative example. Referring to FIG. 9B showing an enlarged view of a portion "B" of FIG. 9A, the radiation efficiency of the antenna 920 according to an embodiment of the present disclosure increases by 1 dB or more in a range from approximately 700 MHz to approximately 800 MHz.

Referring to FIG. 10, reflection coefficient of an antenna 1020 according to the embodiments of FIGS. 7 and 8 may decrease in the low band compared with an antenna 1010 according to a comparative example.

According to the embodiments of the present disclosure described with reference to FIGS. 1 to 10, at least a portion of a conductive sheet layer included in a display may be used as an antenna for communicating with an external electronic device, and noise which may be transmitted to a DDI through the conductive sheet layer may be prevented. Also, since there is no need to include an antenna and a separate component for blocking noise, the thickness of an electronic device may decrease, or the performance or function(s) of the electronic device may be updated.

In addition, even though any other component, which is included in the electronic device, such as a housing is electrically connected with a component, which forms an antenna, such as a conductive sheet layer, electric shock of the user may be prevented by blocking a DC current which may flow to the other component.

Figure 11:
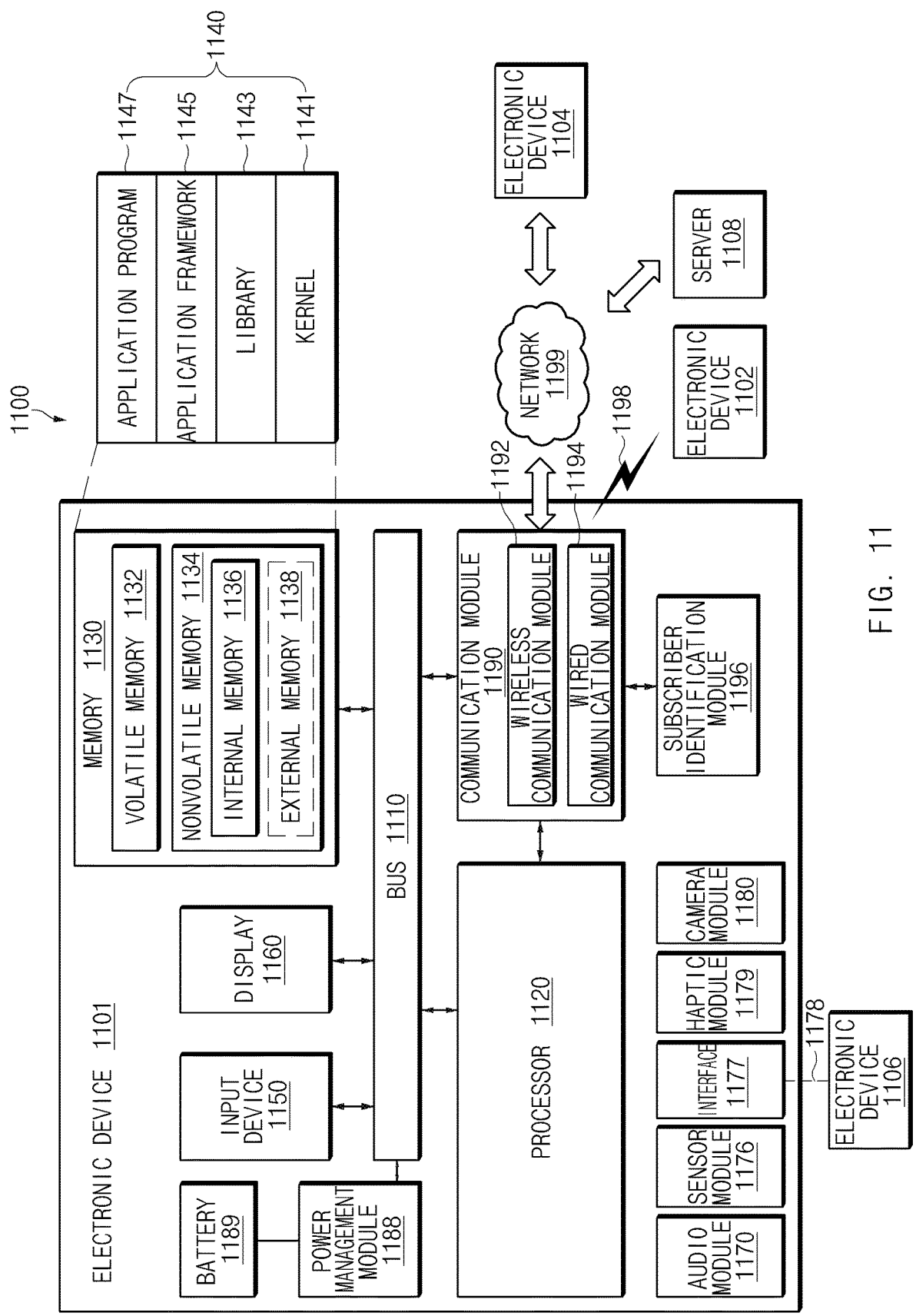
FIG. 11 illustrates a block diagram of an electronic device in a network environment according to various embodiments.

FIG. 11 illustrates a block diagram of an electronic device 1101 in a network environment 1100, according to various embodiments. An electronic device according to various embodiments of the present disclosure may include various forms of devices. For example, the electronic device may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or Motion Picture Experts Group (MPEG-1 or MPEG-2) Audio Layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment, the electronic device may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automated teller machines (ATMs), points of sales (POSs), measuring instruments (e.g., water meters, electricity meters, or gas meters), or internet of things (e.g., light bulbs, sprinkler devices, fire alarms, thermostats, or street lamps). The electronic device according to an embodiment of the present disclosure may not be limited to the above-described devices, and may provide functions of a plurality of devices like smartphones which have measurement function of personal biometric information (e.g., heart rate or blood glucose). In the present disclosure, the term "user" may refer to a person who uses an electronic device or may refer to a device (e.g., an artificial intelligence electronic device) that uses the electronic device.

Referring to FIG. 11, under the network environment 1100, the electronic device 1101 (e.g., the electronic device 100 of FIG. 1) may communicate with an electronic device 1102 through local wireless communication 1198 or may communication with an electronic device 1104 or a server 1108 through a network 1199. According to an embodiment, the electronic device 1101 may communicate with the electronic device 1104 through the server 1108.

According to an embodiment, the electronic device 1101 may include a bus 1110, a processor 1120, a memory 1130, an input device 1150 (e.g., a micro-phone or a mouse), a display device 1160, an audio module 1170, a sensor module 1176, an interface 1177, a haptic module 1179, a camera module 1180, a power management module 1188, a battery 1189, a communication module 1190, and a subscriber identification module 1196. According to an embodiment, the electronic device 1101 may not include at least one (e.g., the display device 1160 or the camera module 1180) of the above-described components or may further include other component(s).

The bus 1110 may interconnect the above-described components 1120 to 1190 and may include a circuit for conveying signals (e.g., a control message or data) between the above-described components.

The processor 1120 may include one or more of a central processing unit (CPU), an application processor (AP), a graphic processing unit (GPU), an image signal processor (ISP) of a camera or a communication processor (CP). According to an embodiment, the processor 1120 may be implemented with a system on chip (SoC) or a system in package (SiP). For example, the processor 1120 may drive an operating system (OS) or an application program to control at least one of another component (e.g., hardware or software component) of the electronic device 1101 connected to the processor 1120 and may process and compute various data. The processor 1120 may load a command or data, which is received from at least one of other components (e.g., the communication module 1190), into a volatile memory 1132 to process the command or data and may store the result data into a nonvolatile memory 1134.

The memory 1130 may include, for example, the volatile memory 1132 or the nonvolatile memory 1134. The volatile memory 1132 may include, for example, a random access memory (RAM) (e.g., a dynamic RAM (DRAM), a static RAM (SRAM), or a synchronous DRAM (SDRAM)). The nonvolatile memory 1134 may include, for example, a programmable read-only memory (PROM), an one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 1134 may be configured in the form of an internal memory 1136 or the form of an external memory 1138 which is available through connection only if necessary, according to the connection with the electronic device 1101. The external memory 1138 may further include a flash drive such as compact flash (CF), secure digital (SD), micro secure digital (Micro-SD), mini secure digital (Mini-SD), extreme digital (xD), a multimedia card (MMC), or a memory stick. The external memory 1138 may be operatively or physically connected with the electronic device 1101 in a wired manner (e.g., a cable or a universal serial bus (USB)) or a wireless (e.g., Bluetooth) manner.

For example, the memory 1130 may store, for example, at least one different software component, such as a command or data associated with the program 1140, of the electronic device 1101. The program 1140 may include, for example, a kernel 1141, a library 1143, an application framework 1145 or an application program (interchangeably, "application") 1147.

The input device 1150 may include a microphone, a mouse, or a keyboard. According to an embodiment, the keyboard may include a keyboard physically connected or a virtual keyboard displayed through the display device 1160.

The display device 1160 may include a display, a hologram device or a projector, and a control circuit to control a relevant device. The display may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 1101.

The audio module 1170 may convert, for example, from a sound into an electrical signal or from an electrical signal into the sound. According to an embodiment, the audio module 1170 may acquire sound through the input device 1150 (e.g., a microphone) or may output sound through an output device (not illustrated) (e.g., a speaker or a receiver) included in the electronic device 1101, an external electronic device (e.g., the electronic device 1102 (e.g., a wireless speaker or a wireless headphone)) or an electronic device 1106 (e.g., a wired speaker or a wired headphone) connected with the electronic device 1101

The sensor module 1176 may measure or detect, for example, an internal operating state (e.g., power or temperature) of the electronic device 1101 or an external environment state (e.g., an altitude, a humidity, or brightness) to generate an electrical signal or a data value corresponding to the information of the measured state or the detected state. The sensor module 1176 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint sensor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an UV sensor. The sensor module 1176 may further include a control circuit for controlling at least one or more sensors included therein. According to an embodiment, the electronic device 1101 may control the sensor module 1176 by using the processor 1120 or a processor (e.g., a sensor hub) separate from the processor 1120. In the case that the separate processor (e.g., a sensor hub) is used, while the processor 1120 is in a sleep state, the separate processor may operate without awakening the processor 1120 to control at least a portion of the operation or the state of the sensor module 1176.

According to an embodiment, the interface 1177 may include a high definition multimedia interface (HDMI), a universal serial bus (USB), an optical interface, a recommended standard 232 (RS-232), a D-subminiature (D-sub), a mobile high-definition link (MHL) interface, a SD card/MMC (multi-media card) interface, or an audio interface. A connector 1178 may physically connect the electronic device 1101 and the electronic device 1106. According to an embodiment, the connector 1178 may include, for example, an USB connector, an SD card/MMC connector, or an audio connector (e.g., a headphone connector).

The haptic module 1179 may convert an electrical signal into mechanical stimulation (e.g., vibration or motion) or into electrical stimulation. For example, the haptic module 1179 may apply tactile or kinesthetic stimulation to a user. The haptic module 1179 may include, for example, a motor, a piezoelectric element, or an electric stimulator.

The camera module 1180 may capture, for example, a still image and a moving picture. According to an embodiment, the camera module 1180 may include at least one lens (e.g., a wide-angle lens and a telephoto lens, or a front lens and a rear lens), an image sensor, an image signal processor, or a flash (e.g., a light emitting diode or a xenon lamp).

The power management module 1188, which is to manage the power of the electronic device 1101, may constitute at least a portion of a power management integrated circuit (PMIC).

The battery 1189 may include a primary cell, a secondary cell, or a fuel cell and may be recharged by an external power source to supply power at least one component of the electronic device 1101.

The communication module 1190 may establish a communication channel between the electronic device 1101 and an external device (e.g., the first external electronic device 1102, the second external electronic device 1104, or the server 1108). The communication module 1190 may support wired communication or wireless communication through the established communication channel. According to an embodiment, the communication module 1190 may include a wireless communication module 1192 or a wired communication module 1194. The communication module 1190 may communicate with the external device through a first network 1198 (e.g. a wireless local area network such as Bluetooth or infrared data association (IrDA)) or a second network 1199 (e.g., a wireless wide area network such as a cellular network) through a relevant module among the wireless communication module 1192 or the wired communication module 1194.

The wireless communication module 1192 may support, for example, cellular communication, local wireless communication, and global navigation satellite system (GNSS) communication. The cellular communication may include, for example, long-term evolution (LTE), LTE Advance (LTE-A), code division multiple access (CDMA), wideband CDMA (WCDMA), universal mobile telecommunications system (UMTS), Wireless Broadband (WiBro), or Global System for Mobile Communications (GSM). The local wireless communication may include wireless fidelity (Wi-Fi), Wi-Fi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a Global Positioning System (GPS), a Global Navigation Satellite System (Glonass), Beidou Navigation Satellite System (Beidou), the European global satellite-based navigation system (Galileo), or the like. In the present disclosure, "GPS" and "GNSS" may be interchangeably used.

According to an embodiment, when the wireless communication module 1192 supports cellar communication, the wireless communication module 1192 may, for example, identify or authenticate the electronic device 1101 within a communication network using the subscriber identification module (e.g., a SIM card) 1196. According to an embodiment, the wireless communication module 1192 may include a communication processor (CP) separate from the processor 1120 (e.g., an application processor (AP)). In this case, the communication processor may perform at least a portion of functions associated with at least one of components 1110 to 1196 of the electronic device 1101 in substitute for the processor 1120 when the processor 1120 is in an inactive (sleep) state, and together with the processor 1120 when the processor 1120 is in an active state. According to an embodiment, the wireless communication module 1192 may include a plurality of communication modules, each supporting only a relevant communication scheme among cellular communication, local wireless communication, or a GNSS communication.

The wired communication module 1194 may include, for example, a local area network (LAN) service, a power line communication, or a plain old telephone service (POTS).

For example, the first network 1198 may employ, for example, Wi-Fi direct or Bluetooth for transmitting or receiving commands or data through wireless direct connection between the electronic device 1101 and the first external electronic device 1102. The second network 1199 may include a telecommunication network (e.g., a computer network such as a LAN or a WAN, the Internet or a telephone network) for transmitting or receiving commands or data between the electronic device 1101 and the second electronic device 1104.

According to various embodiments, the commands or the data may be transmitted or received between the electronic device 1101 and the second external electronic device 1104 through the server 1108 connected with the second network 1199. Each of the first and second external electronic devices 1102 and 1104 may be a device of which the type is different from or the same as that of the electronic device 1101. According to various embodiments, all or a part of operations that the electronic device 1101 will perform may be executed by another or a plurality of electronic devices (e.g., the electronic devices 1102 and 1104 or the server 1108). According to an embodiment, in the case that the electronic device 1101 executes any function or service automatically or in response to a request, the electronic device 1101 may not perform the function or the service internally, but may alternatively or additionally transmit requests for at least a part of a function associated with the electronic device 1101 to any other device (e.g., the electronic device 1102 or 1104 or the server 1108). The other electronic device (e.g., the electronic device 1102 or 1104 or the server 1108) may execute the requested function or additional function and may transmit the execution result to the electronic device 1101. The electronic device 1101 may provide the requested function or service using the received result or may additionally process the received result to provide the requested function or service. To this end, for example, cloud computing, distributed computing, or client-server computing may be used.

Figure 12:
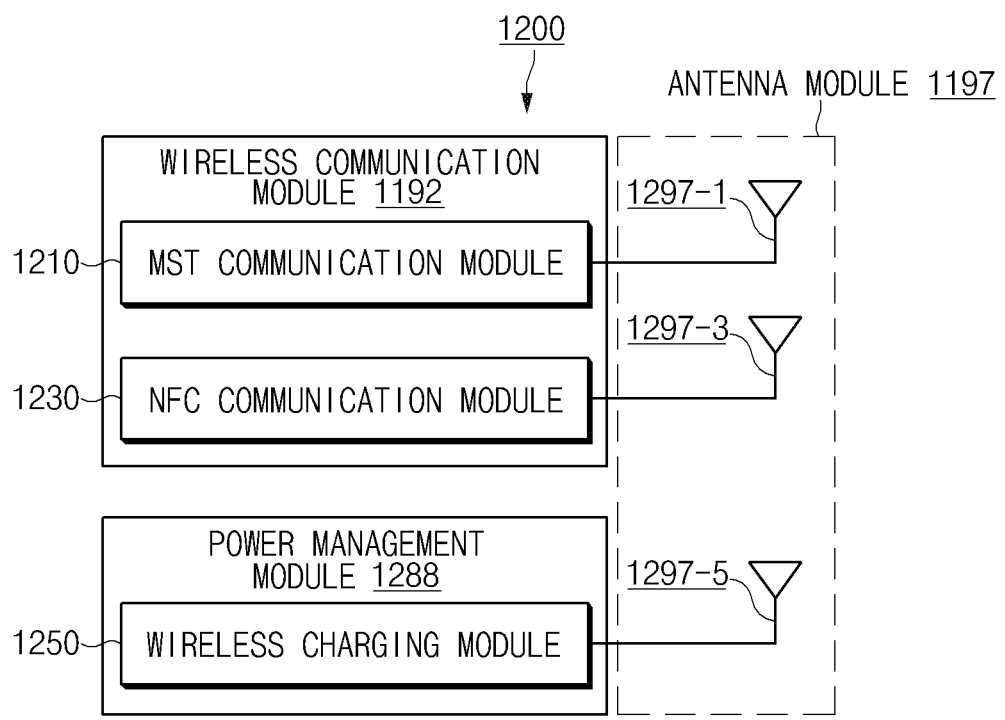
FIG. 12 is a block diagram illustrating a wireless communication module, a power management module, and an antenna module of an electronic device, according to various embodiments.

FIG. 12 is a block diagram 1200 illustrating the wireless communication module 1192, the power management module 1188, and the antenna module 1197 of the electronic device 1101 according to various embodiments. Referring to FIG. 12, the wireless communication module 1192 may include an MST communication module 1210 or an NFC communication module 1230, and the power management module 1188 may include a wireless charging module 1250. In this case, an antenna module 1297 may separately include a plurality of antennas which includes an MST antenna 1297-1 connected with the MST communication module 1210, an NFC antenna 1297-3 connected with the NFC communication module 1230, and a wireless charging antenna 1297-5 connected with the wireless charging module 1250. To avoid redundancy, additional description associated with components which are the same as the components of FIG. 11 will be omitted or will be briefly described.

The MST communication module 1210 may receive a signal (e.g., a signal including control information or payment information) from the processor 1120, may generate a magnetic signal corresponding to the signal received through the MST antenna 1297-1, and may transmit the generated magnetic signal to the external electronic device 1102 (e.g., a POS device). According to an embodiment, for example, the MST communication module 1210 may include a switching module (not illustrated) including one or more switches connected with the MST antenna 1297-1, and may control the switching module to change a direction of a voltage or a current to be supplied to the MST antenna 1297-1. For example, a direction of a magnetic signal may be changed because a magnetic signal (e.g., a magnetic field) to be transmitted to the external electronic device 1102 through the short-range wireless communication 1198 is transmitted through the MST antenna 1297-1. The magnetic signal transmitted with the direction changed may cause a form and an effect which are similar to those of a magnetic field generated while (or when) a magnetic card is swiped by a card reader of the electronic device 1102. According to an embodiment, payment-related information and a control signal received from the electronic device 1102 in the form of the magnetic signal may be transmitted, for example, to a server (e.g., the server 1108) through the network 1199.

The NFC communication module 1230 may obtain a signal (e.g., control information or payment information) from the processor 1120, and may transmit the obtained signal to the external electronic device 1102 through the NFC antenna 1297-3. According to an embodiment, the NFC communication module 1230 may receive a signal (e.g., a signal including control information or payment information) transmitted from the external electronic device 1102 through the NFC antenna 1297-3.

The wireless charging module 1250 may wirelessly transmit a power to the external electronic device 1102 (e.g., a mobile phone or a wearable device) through the wireless charging antenna 1297-5, or may wirelessly receive a power from the external electronic device 1102 (e.g., a wireless charging device). The wireless charging module 1250 may support various wireless charging manners, for example, including a magnetic resonance manner or a magnetic induction manner.

According to an embodiment, some of the MST antenna 1297-1, the NFC antenna 1297-3, or the wireless charging antenna 1297-5 may mutually share at least a portion of a radiation part (or radiator). For example, a radiation part of the MST antenna 1297-1 may be used as a radiation part of the NFC antenna 1297-3 or the wireless charging antenna 1297-5, and vice versa. In the case where the MST antenna 1297-1, the NFC antenna 1297-3, or the wireless charging antenna 1297-5 shares at least a partial region of a radiation part, the antenna module 1297 may include a switching circuit (not illustrated) for selectively connecting or separating (e.g., opening) at least a part of the antennas 1297-1, 1297-3, and 1297-5 under control of the wireless communication module 1192 (e.g., the MST communication module 1210 or the NFC communication module 1230) or a power management module (e.g., the wireless charging module 1250). For example, in the case where the electronic device 1101 uses a wireless charging function, the NFC communication module 1230 or the wireless charging module 1250 may control the switching circuit such that the at least a partial region of the radiation part shared by the NFC antenna 1297-3 and the wireless charging antenna 1297-5 is temporarily separated from the NFC antenna 1297-3 and is connected only with the wireless charging antenna 1297-5.

According to an embodiment, at least a part of functions of the MST communication module 1210, the NFC communication module 1230, or the wireless charging module 1250 may be controlled by an external processor (e.g., the processor 1120). According to an embodiment, specified functions (e.g., a payment function) of the MST communication module 1210 or the NFC communication module 1230 may be performed in a trusted execution environment (TEE). The trusted execution environment (TEE) according to various embodiments may be, for example, an execution environment in which at least a portion of a specified region of the memory 1130 is assigned to perform a function (e.g., a financial transaction or a private information related function) needing a relatively high level of security and an access to the specified region is separately and restrictively allowed, for example, depending on an access subject or an application to be executed.

Figure 13:
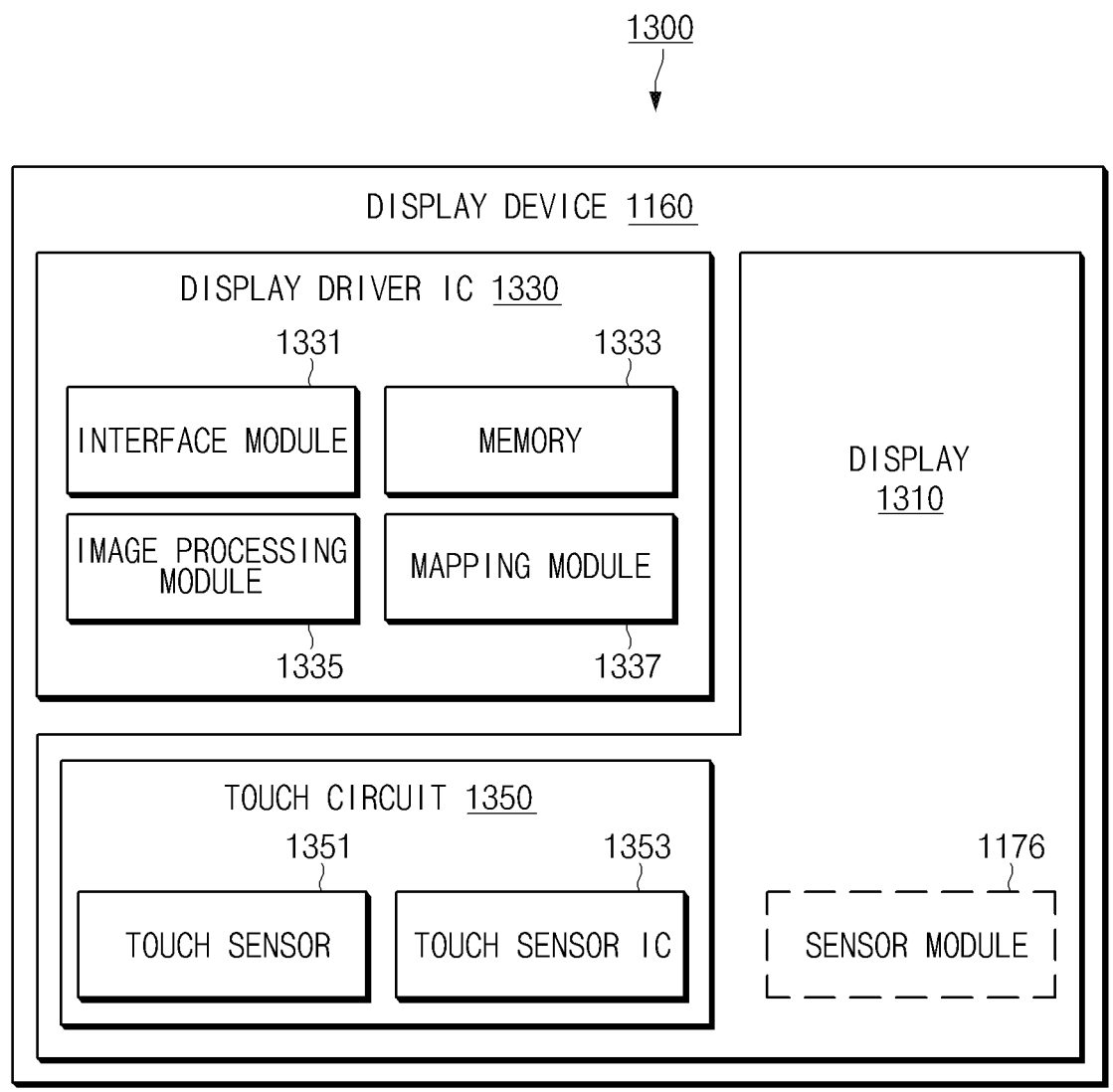
FIG. 13 is a block diagram illustrating an electronic device according to various embodiments of the present disclosure.

FIG. 13 is a block diagram 1300 illustrating the display device 1160 according to various embodiments. Referring to FIG. 13, the display device 1160 may include a display 1310, and a display driver IC (DDI) 1330 for controlling the display 1310. The DDI 1330 may include an interface module 1331, a memory 1333 (e.g., a buffer memory), an image processing module 1335, or a mapping module 1337. The DDI 1330 may receive image information including image data or an image control signal corresponding to a command for controlling the image data, for example, from the processor 1120 (e.g., the main processor 1121 (e.g., an application processor) or the auxiliary processor 1123 operated independently of a function of the main processor 1121) through the interface module 1331. The DDI 1330 may communicate with a touch circuit 1350 or the sensor module 1176 through the interface module 1331. Also, the DDI 1330 may store at least a portion of the received image information in the memory 1333, for example, by the frame. The image processing module 1335 may perform pre-processing or post-processing (e.g., resolution, brightness, or size adjustment) on at least a portion of the image data, for example, based at least on a characteristic of the image data or a characteristic of the display 1310. The mapping module 1337 may convert the image data pre-processed or post-processed through the image processing module 1335 to a voltage value or a current value for driving pixels in the display 1310, based at least partly on attributes (e.g., the arrangement (an RGB stripe or pentile) of the pixels or the size of each of sub-pixels) of the pixels. When at least a part of the pixels in the display 1310 is driven, for example, based on the voltage value or the current value, visual information (e.g., a text, an image, or an icon) corresponding to the image data may be displayed in the display 1310.

According to an embodiment, the display device 1160 may further include the touch circuit 1350. The touch circuit 1350 may include a touch sensor 1351 and a touch sensor IC 1353 for controlling the touch sensor 751. The touch sensor IC 1353 may control the touch sensor 1351, for example, to sense a touch input or a hovering input associated with a specific position of the display 1310 by measuring a change of a signal (e.g., a voltage, the amount of light, a resistance value, or the amount of charges) associated with the specific position, and may provide information (e.g., a location, the area, or a time) about the sensed touch input or hovering input to the processor 1120. According to an embodiment, at least a part (e.g., the touch sensor IC 1353) of the touch circuit 1350 may be included as a part of the display driver IC 1330 or the display 1310, or as a part of any other component (e.g., the coprocessor 1123) positioned outside the display device 760.

According to an embodiment, the display device 1160 may further include at least one sensor (e.g., a fingerprint sensor, an iris sensor, a pressure sensor, or an illuminance sensor) in the sensor module 1176, or a control circuit associated with the at least one sensor. In this case, the at least one sensor or the control circuit associated with the at least one sensor may be embedded in a part (e.g., the display 1310 or the DDI 1330) of the display device 1160 or in a part of the touch circuit 1350. For example, in the case where the sensor module 1176 embedded in the display device 1160 includes a biometric sensor (e.g., a fingerprint sensor), the biometric sensor may obtain biometric information (e.g., a fingerprint image) associated with a touch input through a partial region of the display 1310. For another example, in the case where the sensor module 1176 embedded in the display device 1160 includes a pressure sensor, the pressure sensor may obtain pressure information associated with a touch input through a partial region or the whole region of the display 1310. According to an embodiment, the touch sensor 1351 or the sensor module 1176 may be positioned between pixels of a pixel layer of the display 1310 or above or below the pixel layer.

Various embodiments of the present disclosure and terms used herein are not intended to limit the technologies described in the present disclosure to specific embodiments, and it should be understood that the embodiments and the terms include modification, equivalent, and/or alternative on the corresponding embodiments described herein. With regard to description of drawings, similar components may be marked by similar reference numerals. The terms of a singular form may include plural forms unless otherwise specified. In the disclosure disclosed herein, the expressions "A or B", "at least one of A and/or B", "A, B, or C", or "at least one of A, B, and/or C", and the like used herein may include any and all combinations of one or more of the associated listed items. Expressions such as "first," or "second," and the like, may express their components regardless of their priority or importance and may be used to distinguish one component from another component but is not limited to these components. When an (e.g., first) component is referred to as being "(operatively or communicatively) coupled with/to" or "connected to" another (e.g., second) component, it may be directly coupled with/to or connected to the other component or an intervening component (e.g., a third component) may be present.

According to the situation, the expression "adapted to or configured to" used herein may be interchangeably used as, for example, the expression "suitable for", "having the capacity to", "changed to", "made to", "capable of" or "designed to" in hardware or software. The expression "a device configured to" may mean that the device is "capable of" operating together with another device or other parts. For example, a "processor configured to (or set to) perform A, B, and C" may mean a dedicated processor (e.g., an embedded processor) for performing corresponding operations or a generic-purpose processor (e.g., a central processing unit (CPU) or an application processor (AP)) which performs corresponding operations by executing one or more software programs which are stored in a memory device (e.g., the memory 1130).

The term "module" used herein may include a unit, which is implemented with hardware, software, or firmware, and may be interchangeably used with the terms "logic", "logical block", "part", "circuit", or the like. The "module" may be a minimum unit of an integrated part or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media (e.g., the memory 1130) in the form of a program module. The instruction, when executed by a processor (e.g., the processor 1120), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each component (e.g., a module or a program module) according to various embodiments may be composed of single entity or a plurality of entities, a part of the above-described sub-components may be omitted, or other sub-components may be further included. Alternatively or additionally, after being integrated in one entity, some components (e.g., a module or a program module) may identically or similarly perform the function executed by each corresponding component before integration. According to various embodiments, operations executed by modules, program modules, or other components may be executed by a successive method, a parallel method, a repeated method, or a heuristic method, or at least one part of operations may be executed in different sequences or omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a housing;
a display viewable through a first region of a front surface of the housing;
a first antenna positioned at a rear surface of the housing when viewed in a first direction; and
a communication circuit positioned within the housing,
wherein the display includes a pixel layer including pixels and a conductive sheet layer on a first side of the pixel layer,
wherein the conductive sheet layer includes a first conductive region, a second conductive region, and a slit between the first conductive region and the second conductive region,
wherein the first antenna is electrically connected with the first conductive region of the conductive sheet layer, and
wherein the communication circuit is configured to receive a signal in a specified frequency band through the first antenna and the first conductive region used as a second antenna.

2. The electronic device of claim 1, wherein the first conductive region of the conductive sheet layer is positioned outside a region which includes a data line to transmit data to the pixels.

3. The electronic device of claim 1, wherein the first conductive region and the second conductive region of the conductive sheet layer are physically separated by the slit.

4. The electronic device of claim 1, further comprising:
a ground region provided within the housing,
wherein each of the first conductive region and the second conductive region of the conductive sheet layer is electrically connected with the ground region.

5. The electronic device of claim 4, wherein the communication circuit is disposed on a printed circuit board (PCB), and
wherein the PCB includes the ground region.

6. The electronic device of claim 1, wherein the slit is formed at the conductive sheet layer with a specified interval, and
wherein the specified interval is determined based on an electrical path formed in the first region of the conductive sheet layer for receiving a signal.

7. The electronic device of claim 1, wherein the first region of the conductive sheet layer is at least a partial region of an edge of the conductive sheet layer.

8. The electronic device of claim 1, wherein the first conductive region and the second conductive region of the conductive sheet layer are disposed in a same plane.

9. The electronic device of claim 1, further comprising:
a bracket coupled between the housing and the display,
wherein the first conductive region of the conductive sheet layer is coupled with the bracket by a conductive tape,
wherein the bracket is coupled with the housing by c-clip or a screw, and
wherein the first antenna is electrically connected with the first conductive region through the c-clip or the screw.

10. An electronic device comprising:
a display panel including at least one pixel for displaying an image;
a metal member formed adjacent to at least a partial region of the display panel and formed at at least a portion of a housing of the electronic device;
a metal layer positioned below the display panel and including a first region and a second region physically separated from the first region,
wherein the first region of the metal layer, used as an antenna, is electrically connected with the metal member; and
a substrate positioned below the metal layer and including a ground connected with the second region of the metal layer,
wherein the metal member is positioned at a rear surface of the housing when viewed in a first direction, and
wherein at least one wireless circuit which receives a signal through the metal member is positioned on the substrate.

11. An electronic device comprising:
a housing;
a display viewable through a first region of a front surface of the housing; and
a communication circuit positioned within the housing,
wherein at least a portion of the housing includes a metal member,
wherein the metal member is positioned at a rear surface of the housing when viewed in a first direction,
wherein the display includes a pixel layer including pixels and a conductive sheet layer on a first side of the pixel layer,
wherein the conductive sheet layer includes a first conductive region, a second conductive region, and a slit between the first conductive region and the second conductive region,
wherein the first conductive region is used as an antenna,
wherein the metal member of the housing is electrically connected with the first conductive region of the conductive sheet layer, and
wherein the communication circuit is configured to receive a signal in a specified frequency band through the first conductive region and the metal member.

12. The electronic device of claim 11, wherein the first conductive region of the conductive sheet layer is positioned outside a region which includes a data line to transmit data to the pixels.

13. The electronic device of claim 11, wherein the first conductive region and the second conductive region of the conductive sheet layer are physically separated by the slit.

14. The electronic device of claim 11, further comprising:
a ground region provided within the housing,
wherein each of the first conductive region and the second conductive region of the conductive sheet layer is electrically connected with the ground region.

15. The electronic device of claim 14, further comprising:
a capacitor connected on an electrical path between the metal member and the ground region.

* * * * *